United States Patent
Hoshino et al.

(10) Patent No.: US 9,989,723 B2
(45) Date of Patent: Jun. 5, 2018

(54) LOOSE TUBE-TYPE OPTICAL FIBER UNIT

(71) Applicant: FURUKAWA ELECTRIC CO., LTD., Tokyo (JP)

(72) Inventors: Yutaka Hoshino, Tokyo (JP); Noboru Okada, Tokyo (JP); Tatsuya Oyama, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days. days.

(21) Appl. No.: 15/510,521

(22) PCT Filed: Jan. 13, 2015

(86) PCT No.: PCT/JP2015/050650
§ 371 (c)(1),
(2) Date: Mar. 10, 2017

(87) PCT Pub. No.: WO2016/042784
PCT Pub. Date: Mar. 24, 2016

(65) Prior Publication Data
US 2017/0299829 A1 Oct. 19, 2017

(30) Foreign Application Priority Data
Sep. 17, 2014 (JP) ................................ 2014-188548

(51) Int. Cl.
*G02B 6/44* (2006.01)
(52) U.S. Cl.
CPC ........... *G02B 6/4404* (2013.01); *G02B 6/443* (2013.01)

(58) Field of Classification Search
None
See application file for complete search history.

(56) References Cited

U.S. PATENT DOCUMENTS 8,787,718 B2 *   7/2014   Tanabe ................. G02B 6/4403
                                                         385/102
9,739,965 B2 *   8/2017   Isaji ..................... G02B 6/4403
(Continued)

FOREIGN PATENT DOCUMENTS

JP   2007-279226 A   10/2007
JP   2010-008923 A    1/2010
(Continued)

OTHER PUBLICATIONS

International Search Report issued in PCT/JP2015/050650 dated Apr. 14, 2015.
(Continued)

*Primary Examiner* — Sung Pak
(74) *Attorney, Agent, or Firm* — Marshall, Gerstein & Borun LLP

(57) ABSTRACT

An optical fiber ribbon comprises a plurality of optical fiber strands that are arranged side-by-side in one direction and integrated. The optical fiber ribbon comprises a plurality of optical fiber strands that are bonded in parallel. In the optical fiber ribbon, the adjacent optical fiber strands are bonded using a bonding section in which the same are continuously bonded along the entire length thereof and a bonding section in which the same are intermittently bonded at prescribed intervals. In other words, either of the bonding sections is formed between the adjacent optical fiber strands.

6 Claims, 10 Drawing Sheets

(56) References Cited

U.S. PATENT DOCUMENTS

2011/0110635 A1* 5/2011 Toge .................... G02B 6/4403
385/102
2014/0016905 A1* 1/2014 Tanabe ................. G02B 6/4405
385/114

FOREIGN PATENT DOCUMENTS

| JP | 2011-221163 A | 11/2011 |
| JP | 2012-208443 A | 10/2012 |
| JP | 2012-234122 A | 11/2012 |
| JP | 2013-054219 A | 3/2013 |
| JP | 2014-085592 A | 5/2014 |

OTHER PUBLICATIONS

Office Action issued in U.S. Appl. No. 15/510,454, dated Sep. 14, 2017.
International Search Report issued in PCT/JP2015/050657, dated Apr. 7, 2015.
Written Opinion issued in PCT/JP2015/050657, dated Apr. 7, 2015.

\* cited by examiner

LOOSE TUBE-TYPE OPTICAL FIBER UNIT

TECHNICAL FIELD

This disclosure relates to a loose tube-type optical fiber unit that includes a plurality of optical fiber ribbons.

BACKGROUND

There has been a conventional loose tube cable formed by packaging optical fibers in loose tubes to form loose tube-type optical fiber units and twisting these loose tube-type optical fiber units around a tension member, such as in Japanese Unexamined Patent Application Publication No. 2013-54219 (JP-A-2013-54219), for example.

When a loose tube includes single-core optical fibers inside, there may be differences between the lengths of the optical fibers, which are generated by uneven tensile force of the core wires or uneven lengths of the circumferences created at the time of manufacture, and this may deteriorate fiber skew (delay skew of light). In high-speed communication in particular, deterioration of fiber skew becomes a problem.

On the other hand, there is a method in which optical fiber ribbons are used. The optical fiber ribbon is an optical fiber ribbon that includes a plurality of optical fiber strands which are arranged in parallel and integrated. Using optical fiber ribbons allows the optical fiber strands forming the optical fiber ribbons to have the same length.

A loose tube is usually designed to have a large clearance between optical fiber ribbons and an inner surface of the loose tube therein. This is because, if this clearance is small and there is a change in temperature or a bending is given to the fiber, optical fiber strands positioned at both ends of the optical fiber ribbons are pushed toward inner walls of the loose tube, increasing the transmission loss.

As above, since it is necessary to provide a large clearance between the optical fiber ribbons and the inner surface of the loose tube, the diameter of the loose tube is required to be large. Thus, the loose tube itself becomes large.

SUMMARY OF THE DISCLOSURE

The presently described embodiments were achieved in view of such problems. Their object is to provide a small-sized loose tube-type optical fiber unit having excellent transmission characteristics.

To achieve the above object, the presently described embodiments include a loose tube-type optical fiber unit including a plurality of optical fiber ribbons and a loose tube that covers the optical fiber ribbons. The optical fiber ribbon includes optical fiber strands. The adjacent optical fiber strands are bonded and arranged at predetermined intervals. At least some of the optical fiber strands are bonded intermittently along a longitudinal direction of the optical fiber strands.

It is preferable to satisfy relationships:
$5W \leq D \leq 50W$; and
$3 \text{ (mm)} \leq L \leq 40/W$ (where $W \leq 13$ (mm)),
wherein W (mm) represents an overall width of the optical fiber ribbon; L (mm) represents a length of an intermittently-bonded bonding section; and D (mm) represents a distance between the intermittently-bonded bonding sections.

For the bonding sections between all the optical fiber strands, half or more of the bonding sections are preferably bonded intermittently along the longitudinal direction of the optical fiber strands.

All of the optical fiber strands may be bonded intermittently along the longitudinal direction of the optical fiber strands.

According to the presently described embodiments, the optical fiber ribbons are formed by intermittently bonding at least some of the bonding sections, and thus the bonding sections between the optical fiber strands bend easily. Thus, when a part of the optical fiber ribbons comes into contact with an inner surface of the loose tube, an alignment direction of the optical fiber ribbons deforms and stress given from the inner surface of the loose tube can be distributed. This makes it possible to reduce the clearance between the optical fiber ribbons and the inner surface of the tube, and thus the loose tube-type optical fiber unit can be downsized.

In addition, effects of reducing fiber skew can be obtained with certainty by appropriately setting the length and the intervals of the bonding sections that are bonded intermittently.

In addition, for the bonding sections between all the optical fiber strands, half or more of the bonding sections are preferably bonded intermittently along the longitudinal direction of the optical fiber strands, so that the alignment direction of the optical fiber ribbons can be deformed easily. In particular, the alignment direction of the optical fiber ribbons can be deformed easily if all the bonding sections are intermittent.

The presently described embodiments can provide a small-sized loose tube-type optical fiber unit having excellent transmission characteristics.

BRIEF DESCRIPTION OF DRAWINGS

FIG. 6 is a perspective view showing an optical fiber ribbon 5a.

DETAILED DESCRIPTION

Figure 1:
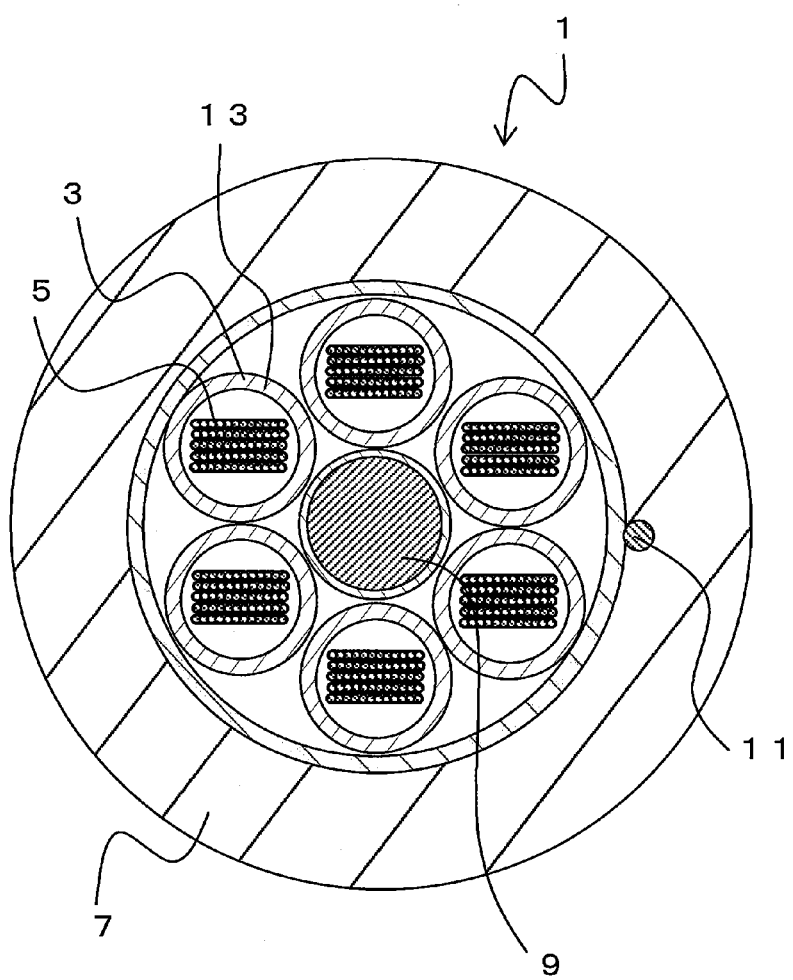
FIG. 1 is a cross sectional view showing an optical fiber cable 1.

Hereinafter, some embodiments will be described with reference to the accompanying drawings. FIG. 1 is a cross sectional view in a diameter direction showing an optical fiber cable 1. The optical fiber cable 1 is an optical fiber cable that accommodates a plurality of loose tube-type optical fiber units.

A tension member 9 is disposed at the center of the cross section of the optical fiber cable 1. The tension member 9 is subjected to tensile force of the optical fiber cable 1. The tension member 9 is made of, for example, a steel wire or fiber reinforced plastic, and a buffer layer is provided on the outer periphery thereof if necessary.

A plurality of optical fiber units 3 are arranged on the outer periphery of the tension member 9. The optical fiber unit 3 is a loose tube-type optical fiber unit. The optical fiber unit 3 accommodates a plurality of optical fiber ribbons 5 in a loose tube 13. The optical fiber unit 3 will be described in detail later.

An outer coating 7 is provided so as to cover the optical fiber units 3. The outer coating 7 is made of, for example, polyethylene. Wrapping tape or the like may be provided on the inner periphery side of the outer coating 7. A ripcord 11 may also be embedded in a part of the outer coating 7.

The optical fiber cable is not limited to the examples shown in the drawings and the number, arrangement, or the size of the optical fibers is designed as appropriate. Also, the structure of the tension member or the ripcord is not limited to the examples shown in the drawings, and the arrangement and the size thereof is designed as appropriate.

Figure 2:
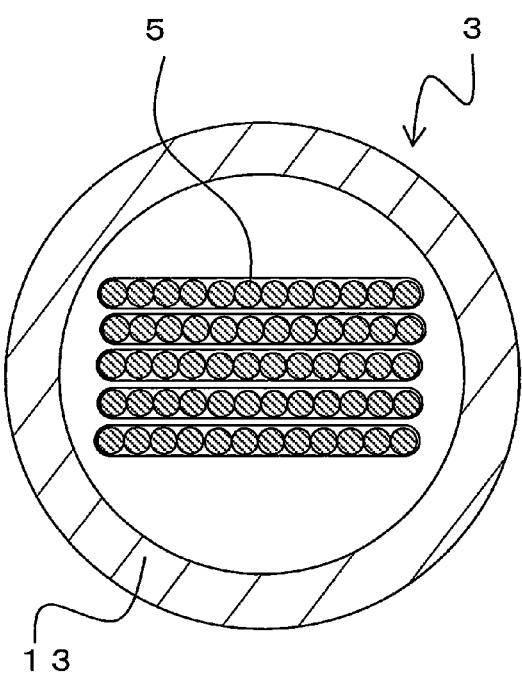
FIG. 2 is a cross sectional view showing an optical fiber unit 3.

Next, the optical fiber unit 3 will be described in detail. FIG. 2 is a cross sectional view of an optical fiber unit 3. As mentioned above, a plurality of optical fiber ribbons 5 are disposed in the loose tube 13. In addition, gel-like member or water-absorbing fiber is enclosed in the space between the inner surface of the loose tube 13 and the optical fiber ribbons 5.

The loose tube 13 is formed of a resin such as polybutylene terephthalate. The gel-like member, or the water absorbing fiber, protects the optical fiber ribbons and has a water-cut-off function. Any publicly known materials can be applied for the loose tube 13 and the gel-like member, or the water-absorbing fiber.

Figure 3:
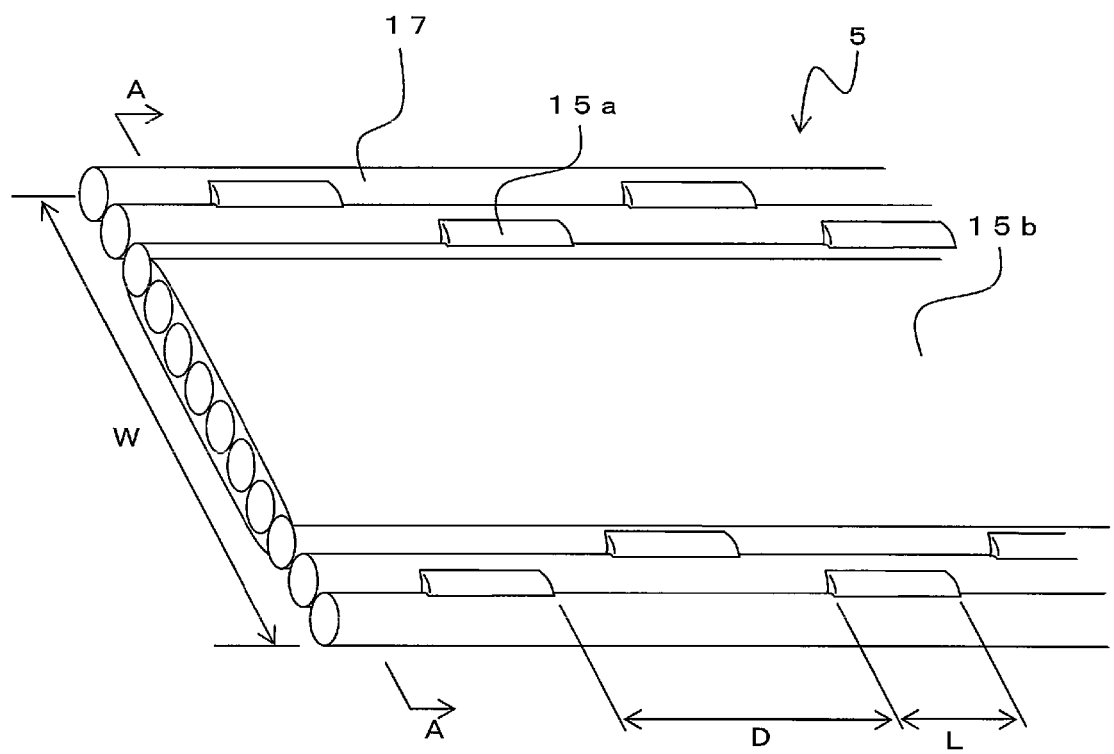
FIG. 3 is a perspective view showing an optical fiber ribbon 5.
Figure 4:
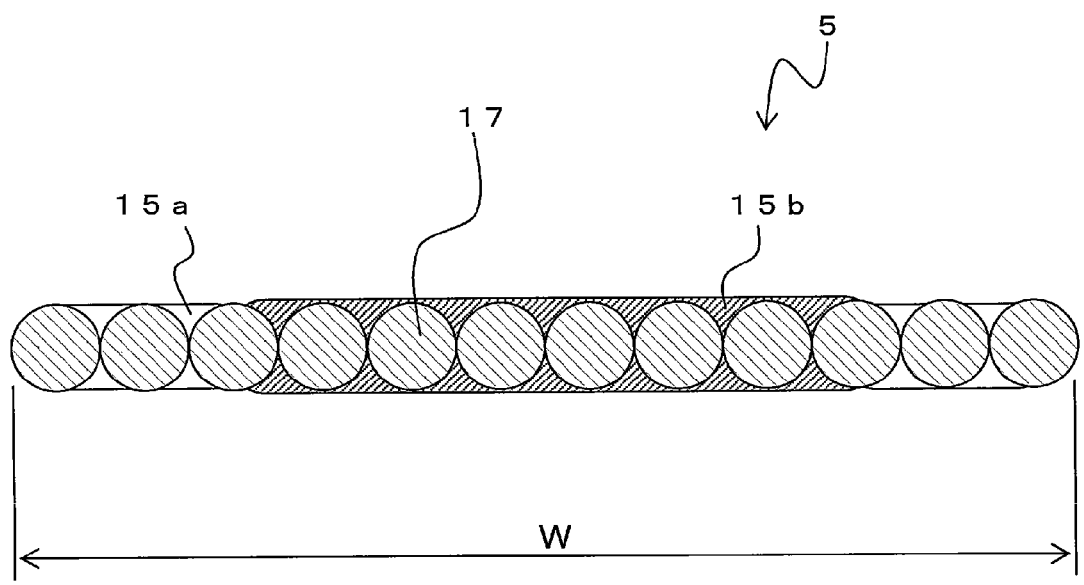
FIG. 4 is a cross sectional view showing the optical fiber ribbon 5.

The optical fiber ribbon 5 includes a plurality of optical fiber strands that are arranged side by side in one direction and integrated. FIG. 3 is a perspective view showing the optical fiber ribbon 5 and FIG. 4 is a cross sectional view taken along A-A line in FIG. 3. The optical fiber ribbon 5 is formed of a plurality of optical fiber strands 17 bonded in parallel. Although an example in the descriptions hereinafter shows a structure formed of twelve optical fiber strands 17, the presently contemplated embodiments are not limited thereto and can be applied to any optical fiber ribbons including a plurality of optical fiber strands.

The optical fiber ribbon 5 includes a bonding section 15b, which bonds the adjacent optical fiber strands 17 by applying adhesive continuously over the entire length thereof, and bonding sections 15a, which bond the optical fiber strands 17 intermittently at predetermined intervals in the longitudinal direction thereof. That is, the adjacent optical fiber strands 17 have either bonding sections 15a or the bonding section 15b formed in between.

Although the bonding section 15b is formed so as to cover the entire periphery of the optical fiber strands 17 in the example shown in the drawings, the bonding section 15b may be provided only between the optical fiber strands 17 so as to expose some parts of the optical fiber strands 17. That is, it is only required that the bonding section 15b is formed continuously in the longitudinal direction of the optical fiber ribbons 5.

In the example shown in the drawings, the bonding sections 15a bond between the first optical fiber strand 17 and the second optical fiber strand 17 from each side of the width direction of the optical fiber ribbon 5, as well as between the second optical fiber strand 17 and the third optical fiber strand 17 from each side. The rest of the optical fiber strands 17 are bonded by the bonding section 15b.

That is, only the predetermined number of the optical fiber strands 17 on each side of the optical fiber ribbon 5 are bonded intermittently by the bonding sections 15a and the predetermined number of the optical fiber strands 17 at the center part are bonded by the bonding section 15b over the entire length thereof. In this way, in the optical fiber ribbon 5, at least some of the optical fiber strands 17 are intermittently bonded in the longitudinal direction of the optical fiber strands 17.

The bonding section 15b bonds the optical fiber strands 17 over its entire length and thus restrains the adjacent optical fiber strands 17 relatively strongly. For this reason, the optical fiber strands 17 are held in a straight line to the parallel direction of the optical fiber strands 17.

While on the other hand, the bonding section 15a restrains the adjacent optical fiber strands 17 with relatively smaller force than the bonding section 15b. Thus, the optical fiber strands 17 that are bonded by the bonding sections 15a can be easily folded (or bent) to the parallel direction of the optical fiber strands 17.

Moreover, if the bonding sections 15a are arranged next to each other, the bonding sections 15a of the adjacent optical fiber strands 17 are disposed so as to be shifted with each other in the longitudinal direction of the optical fiber ribbon 5. For example, it is preferable that the bonding sections 15a next to each other are formed with a shifting of a half pitch in the longitudinal direction of the optical fiber ribbon 5.

Here, L (mm) is the length of the bonding section 15a in the longitudinal direction and D (mm) is the distance between the bonding sections 15a in the longitudinal direction. Also, when W (mm) is the overall width of the optical fiber ribbon 5, it is preferable that the relationship: $5W \leq D \leq 50W$ is satisfied.

If the distance D between the bonding sections 15a is smaller than 5W, it is difficult to fold the adjacent optical fiber strands 17 smoothly and the effects on transmission characteristics are small, which will be described later. Whereas if the distance D between the bonding sections 15a exceeds 50W, the optical fiber strands 17 can move freely, resulting in difficult handling. Also, if the distance D between the bonding sections 15a is large, core wire lengths of optical fiber strands 17 may vary widely, which may lead to deterioration of fiber skew.

Furthermore, in addition to the relationship mentioned above, it is preferable that the relationship: $3 \text{ (mm)} \leq L \leq 40/W$ (where $W \leq 13 \text{ (mm)}$) is satisfied. If L is less than 3 (mm), the bonding sections 15a may break when the optical fiber strands 17 are folded. Whereas if L exceeds 40/W, it is difficult to fold the adjacent optical fiber strands 17 smoothly and the effects on transmission characteristics are small, which will be described later.

Next, the effects on transmission characteristics and the like will be described. When distortion or the like is applied to the optical fiber unit 3, the optical fiber ribbon 5 moves inside the loose tube 13. At this time, the optical fiber ribbon 5 may contact an inner surface of the loose tube 13. When the optical fiber ribbon 5 and the inner surface of the loose tube 13 are in contact in this way, stress is given only to the optical fiber strands 17 that are in contact with the inner surface of the loose tube 13.

If the bonding section 15b alone completely bonds the optical fiber ribbon 5 over its entire length, the optical fiber ribbon 5 is kept, as mentioned above, in a substantially linear shape in the parallel direction. Thus, in the optical fiber ribbon 5, large stress is given to only one or two of the optical fiber strands 17 (the optical fiber strands 17 on both sides thereof). Such stress may lead to deterioration of the transmission characteristics of the optical fiber strands 17.

Figure 5:
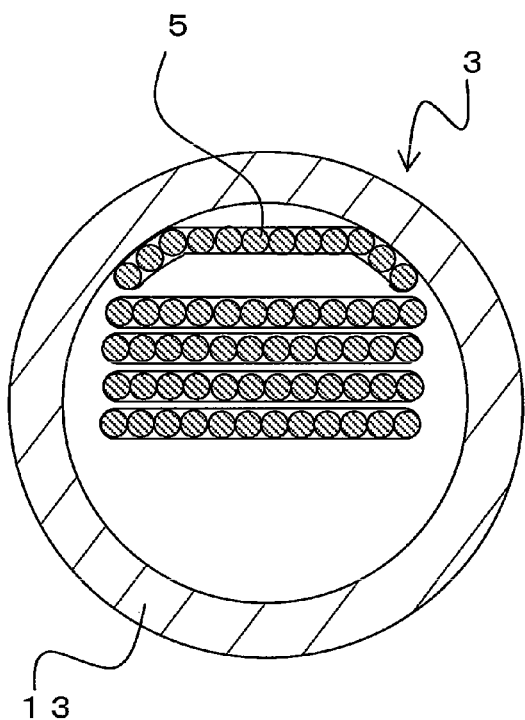
FIG. 5 is a drawing showing a deformed state of the optical fiber ribbon 5 inside a loose tube 13.

FIG. 5 is a cross sectional view showing a state in which distortion or the like is applied to the optical fiber unit 3 and the optical fiber ribbon 5 therein is in contact with the inner surface of the loose tube 13. In the presently described embodiments, the bonding section 15b is provided at a part of the optical fiber ribbon 5. Thus, the adjacent optical fiber strands 17 are folded at the bonding sections 15b. That is, the optical fiber ribbon 5 is in a folded shape instead of being kept in the substantially linear shape in the parallel direction.

When the optical fiber ribbon 5 is folded in this way, the number of the optical fiber strands 17 that are in contact with the inner surface of the loose tube 13 increases. Thus, the stress caused by being in contact with the inner surface of the loose tube 13 is distributed. In addition, the stress given from the loose tube 13 becomes smaller due to the deformation of the optical fiber ribbon 5. Thus, it is possible to suppress stress from being concentrated on some of the optical fiber strands 17. As a result, deterioration in transmission characteristics of the optical fiber strands 17 can be suppressed.

Meanwhile, depending on the direction of the distortion applied to the optical fiber unit 3, tensile force given to each of the optical fiber strands 17 forming the optical fiber ribbon 5 may differ. In this case, the lengths of the optical fiber strands 17 may vary. As a result, fiber skew may be deteriorated.

However, in the presently described embodiments, the optical fiber ribbon 5 has the bonding section 15b formed, and the individual optical fiber strands 17 can move freely in the parts other than the bonding section 15b. This prevents difference between tensile force given to the individual optical fiber strands 17 and suppresses the deterioration of fiber skew. To obtain such effects more effectively, it is preferable, for example, that more than half of all the spaces between the optical fiber strands 17 (that is, the number of the optical fiber strands 17 minus one) are formed with the bonding sections 15a.

Figure 6:
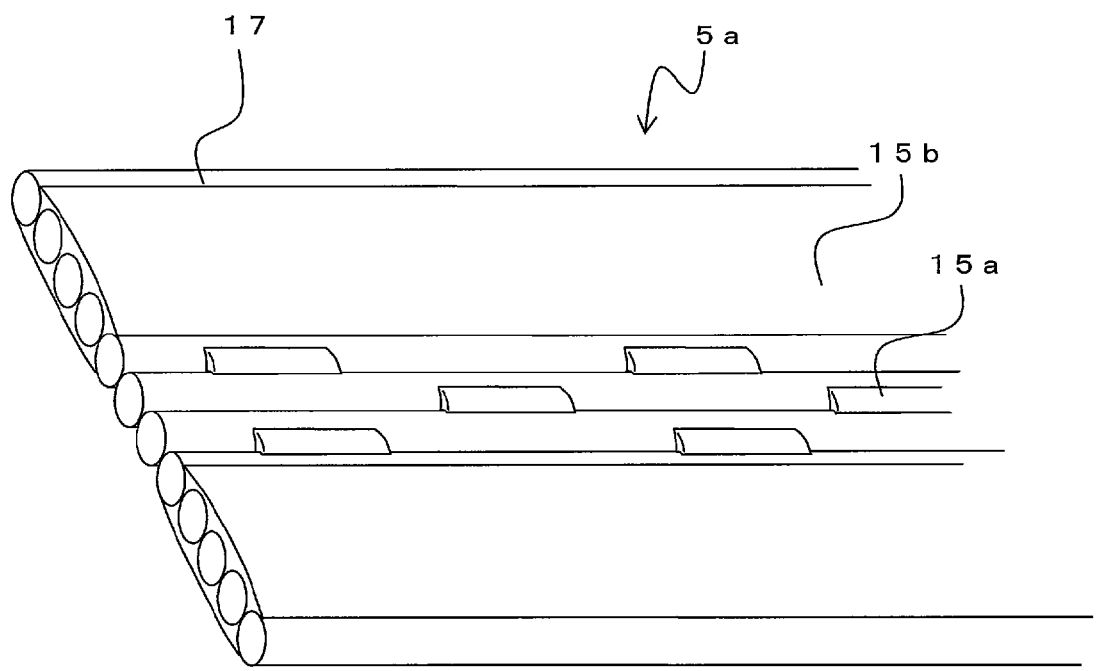

In the presently described embodiments, the forming positions of the bonding sections 15a are not limited to the example shown in FIG. 3. FIG. 6 is a drawing showing an optical fiber ribbon 5a which is another embodiment.

The optical fiber ribbon 5a has a structure similar to the optical fiber ribbon 5 except for the arrangement of the bonding sections 15a and 15b. In the optical fiber ribbon 5a, the bonding sections 15a bond only between the predetermined number (four in the drawing) of the optical fiber strands in the center part and the bonding sections 15b bond the rest of the optical fiber strands.

Figure 7:
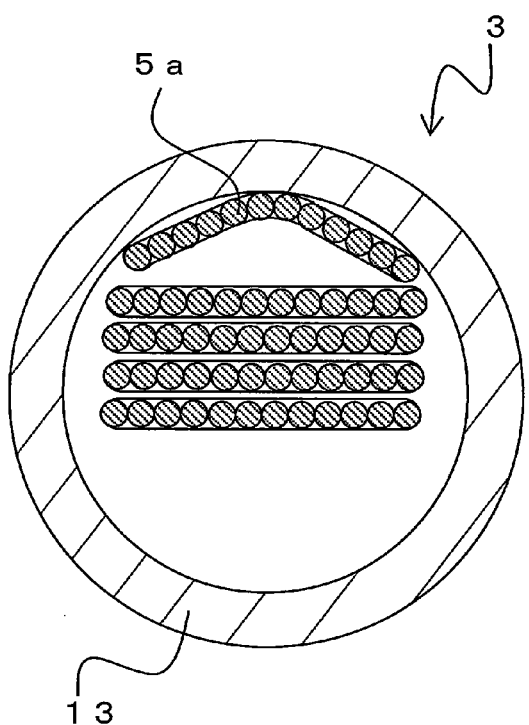
FIG. 7 is a drawing showing a deformed state of the optical fiber ribbon 5a inside the loose tube 13.

FIG. 7 is a cross sectional view showing a state in which distortion or the like is applied to the optical fiber unit 3 and the optical fiber ribbon 5 therein is in contact with the inner surface of the loose tube 13. As mentioned above, at the parts corresponding to the bonding sections 15a in the optical fiber ribbon 5a, the optical fiber ribbon 5a can bend easily. Thus, the substantially center part of the optical fiber ribbon 5a bends and the contacting area between the optical fiber ribbon 5a and the loose tube 13 increases. As a result, the stress given to the optical fiber strands 17 due to being in contact with the loose tube 13 is distributed and deterioration in transmission characteristics and the like can be suppressed.

If the bonding sections 15b bond the overall length of only the both edge parts as in the optical fiber ribbon 5a, workability of inserting the optical fiber ribbons into fusion machine or the like improves when connecting the optical fiber ribbons 5a with one another. This is because the optical fiber strands 17 do not become loose at the edge parts of the optical fiber ribbon 5a.

The same effect as with the optical fiber ribbon 5 can be obtained by using the optical fiber ribbon 5a. In the embodiments described below, it is preferable that more than half of all the spaces between the optical fiber strands 17 (that is, the number of the optical fiber strands 17 minus one) are formed with the bonding sections 15a.

Figure 8:
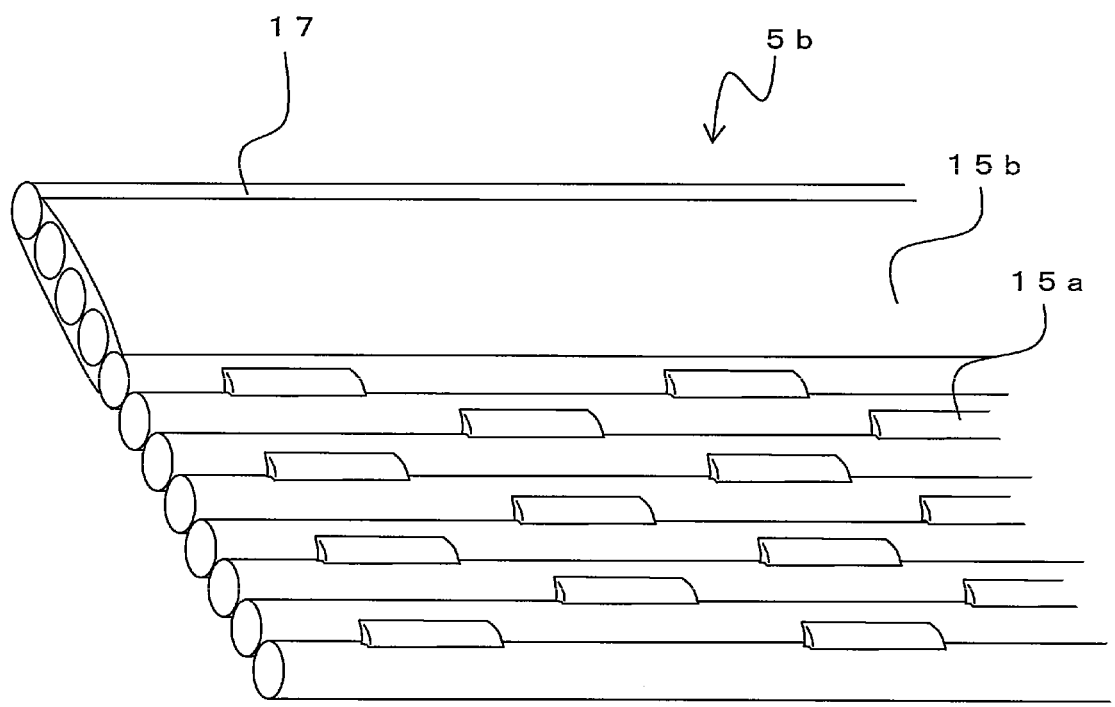
FIG. 8 is a perspective view showing an optical fiber ribbon 5b.

Additionally, an optical fiber ribbon 5b shown in FIG. 8 can also be applied. In the optical fiber ribbon 5b, the bonding sections 15a bond the predetermined number of the optical fiber strands 17 on one edge part side and the bonding section 15b bonds the predetermined number of the optical fiber strands 17 on the other edge part side.

The same effect as in the optical fiber ribbons 5 and 5a can be obtained by using the optical fiber ribbon 5b.

Figure 9:
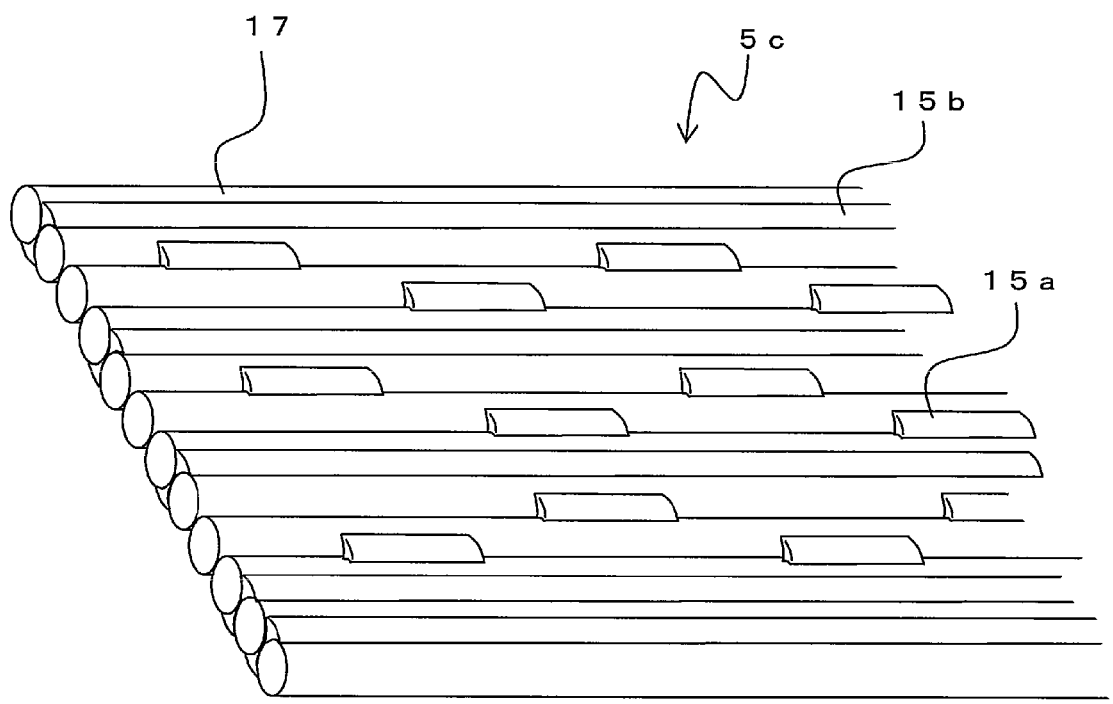
FIG. 9 is a perspective view showing an optical fiber ribbon 5c.

Additionally, an optical fiber ribbon 5c shown in FIG. 9 can also be applied. In the optical fiber ribbon 5c, the bonding section 15a and the bonding section 15b bond the optical fiber strands 17 in turn at every predetermined number of the optical fiber strands 17 (every one strand in the drawing). The bonding sections 15a and the bonding sections 15b may be arranged not only at every one strand as shown in the drawing, but at every two strands, or may be arranged at random.

The same effect as in the optical fiber ribbons 5 and the like can be obtained by using the optical fiber ribbon 5c.

Figure 10:
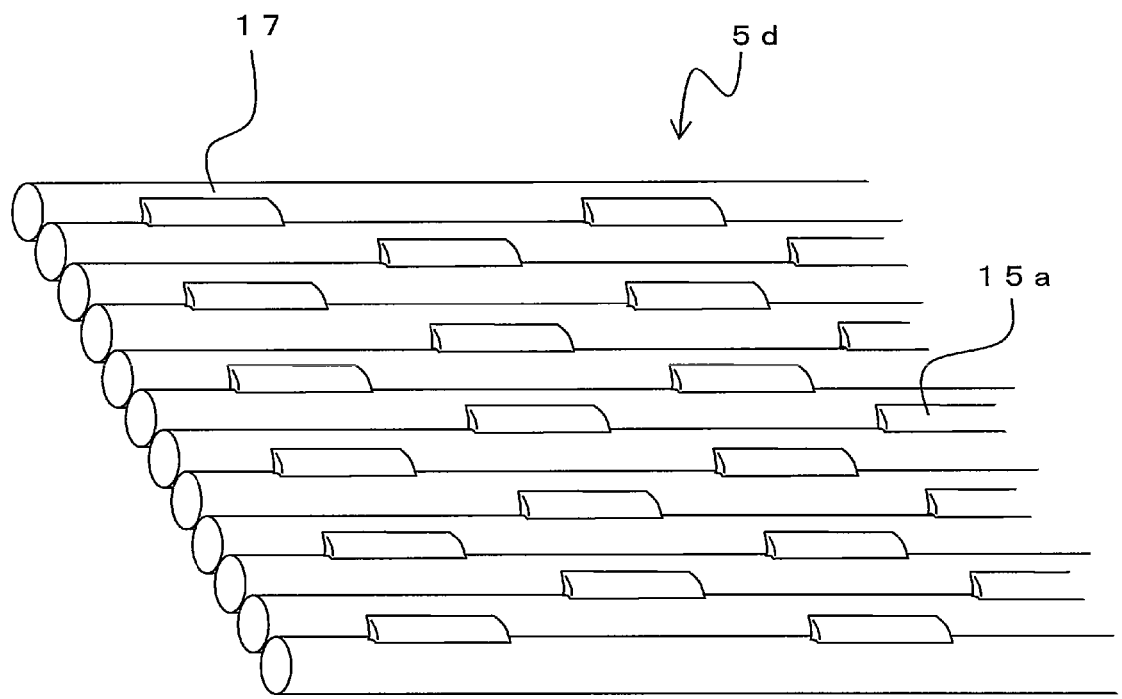
FIG. 10 is a perspective view showing an optical fiber ribbon 5d.

Furthermore, an optical fiber ribbon 5d shown in FIG. 10 can also be applied. In the optical fiber ribbon 5d, all the optical fiber strands 17 are bonded by the bonding sections 15a. Bonding all the optical fiber strands 17 by the bonding sections 15a can improve transmission characteristics.

In the presently described embodiments, at least a part of the optical fiber strands 17 are bonded to one another by the bonding sections 15a and thus spaces between the optical fiber strands 17 can bend easily. For this reason, if a part of the optical fiber ribbon 5 or the like comes into contact with the inner surface of the loose tube 13, the alignment direction of the optical fiber ribbon 5 or the like transforms, allowing the stress given from the inner surface of the loose tube 13 to distribute. This can decrease the clearance between the optical fiber ribbon 5 or the like and the inner surface of the loose tube 13, so that the optical fiber unit 3 can be downsized.

In addition, the effect of reducing the fiber skew can be obtained with certainty by setting the appropriate length and the intervals of the bonding sections 15a that are formed intermittently.

In addition, bonding more than half of all the spaces between the optical fiber strands 17 by the bonding sections 15a can facilitate the transformation in the alignment direction of the optical fiber ribbon 5 or the like and thus the effect of reducing the fiber skew can be improved.

In addition, bonding the entire length of the optical fiber strands 17 at least on the both edge parts with the bonding sections 15b can improve workability of insertion into fusion machine or the like.

In particular, bonding all the optical fiber strands 17 by the bonding sections 15a intermittently can facilitate the transformation in the alignment direction of the optical fiber ribbon 5 or the like.

Although the embodiments have been described referring to the attached drawings, the technical scope of the contemplated and/or claimed embodiments is not limited to the embodiments described above. It is obvious that persons skilled in the art can think out various examples of changes or modifications within the scope of the technical idea disclosed in the specification, and it will be understood that they naturally belong to the technical scope of the following claims.

What is claimed is:

1. A loose tube-type optical fiber unit comprising:
a plurality of optical fiber ribbons; and
a loose tube that covers the optical fiber ribbons, wherein:
the optical fiber ribbon includes optical fiber strands and the adjacent optical fiber strands are bonded and arranged at predetermined intervals;
at least some of the optical fiber strands are bonded intermittently along a longitudinal direction of the optical fiber strands; and
the relationships:
$5W \leq D \leq 50W$; and
$3 \text{ (mm)} \leq L \leq 40/W$ (where $W \leq 13$ (mm))
are satisfied, wherein W (mm) represents an overall width of the optical fiber ribbon; L (mm) represents a length of an intermittently-bonded bonding section; and D (mm) represents a distance between the intermittently-bonded bonding sections.

2. The loose tube-type optical fiber unit according to claim 1, wherein:
for the bonding sections between all the optical fiber strands, half or more of the bonding sections are preferably bonded intermittently along the longitudinal direction of the optical fiber strands.

3. The loose tube-type optical fiber unit according to claim 2, wherein:
all of the optical fiber strands are bonded intermittently along the longitudinal direction of the optical fiber strands.

4. The loose tube-type optical fiber unit according to claim 1, wherein:
the optical fiber ribbon includes twelve optical fiber strands.

5. The loose tube-type optical fiber unit according to claim 1, wherein:
at least some of the optical fiber strands are bonded intermittently along a longitudinal direction of the optical fiber strands and at least some of the optical fiber strands are bonded continuously over the entire length of the optical fiber strands.

6. The loose tube-type optical fiber unit according to claim 1, wherein:
gel-like member or water-absorbing fiber is enclosed in the space between the inner surface of the loose tube and the optical fiber ribbons.

* * * * *